(12) United States Patent
Kass et al.

(10) Patent No.: US 11,544,648 B2
(45) Date of Patent: Jan. 3, 2023

(54) CROWD SOURCED RESOURCES AS SELECTABLE WORKING UNITS

(71) Applicant: Accenture Global Solutions Limited, Dublin (IE)

(72) Inventors: Alex Kass, Palo Alto, CA (US); David H. Nguyen, Santa Clara, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1219 days.

(21) Appl. No.: 15/720,529

(22) Filed: Sep. 29, 2017

(65) Prior Publication Data
US 2019/0102716 A1    Apr. 4, 2019

(51) Int. Cl.
| *G06Q 10/06* | (2012.01) |
| *H04L 51/06* | (2022.01) |
| *G06F 16/27* | (2019.01) |
| *H04L 51/58* | (2022.01) |

(52) U.S. Cl.
CPC ....... *G06Q 10/06315* (2013.01); *G06F 16/27* (2019.01); *G06Q 10/06313* (2013.01); *G06Q 10/063116* (2013.01); *H04L 51/06* (2013.01); *H04L 51/58* (2022.05)

(58) Field of Classification Search
USPC ....................................................... 705/7.12
See application file for complete search history.

(56) References Cited

U.S. PATENT DOCUMENTS

| 7,200,616 | B2 | 4/2007 | Takeuchi | |
| 8,468,244 | B2 | 6/2013 | Redlich | |
| 9,098,343 | B2 * | 8/2015 | Celis | G06F 9/5066 |
| 9,336,268 | B1 | 5/2016 | Moudy | |
| 10,223,244 | B2 | 3/2019 | Tahboub et al. | |
| 10,445,671 | B2 | 10/2019 | Dubey et al. | |
| 2002/0194045 | A1 | 12/2002 | Shay | |
| 2005/0193250 | A1 | 9/2005 | Takeuchi | |
| 2005/0209709 | A1 * | 9/2005 | Bradshaw | G06Q 10/06398 700/2 |
| 2006/0106675 | A1 * | 5/2006 | Cohen | G06Q 30/0601 705/26.1 |
| 2006/0190391 | A1 | 8/2006 | Cullen | |
| 2006/0229902 | A1 * | 10/2006 | McGovern | G06Q 50/10 705/321 |

(Continued)

FOREIGN PATENT DOCUMENTS

WO    WO 2014/111948    7/2014

OTHER PUBLICATIONS

Goel G., et al., "Matching Workers Expertise With Tasks: Incentives in Heterogeneous Crowdsourcing Markets," NIPS Workshop on Crowdsourcing, Dec. 2013, 15 pages, [online], [retrieved on May 29, 2019] Retrieved from the Internet [URL:https://pdfs.semanticscholar.org/8d7e/1f05170561dffbc6b3a7e7aee9611919b75b.pdf].

(Continued)

*Primary Examiner* — Arif Ullah
(74) *Attorney, Agent, or Firm* — Crowell & Moring LLP

(57) ABSTRACT

The global proliferation of high speed communication networks has created unprecedented opportunities for geographically distributed resource interaction. A crowd sourced project management synthesizer provides crowd sourced project management features, as well as resource performance tracking features, to provide efficiencies to the project's implementation.

15 Claims, 9 Drawing Sheets

(56) References Cited

U.S. PATENT DOCUMENTS

| | | | |
|---|---|---|---|
| 2007/0299795 A1* | 12/2007 | Macbeth | G06Q 10/10 706/16 |
| 2008/0077530 A1 | 3/2008 | Banas | |
| 2009/0204470 A1* | 8/2009 | Weyl | G06Q 10/06 705/7.13 |
| 2009/0254572 A1 | 10/2009 | Redlich | |
| 2010/0153155 A1 | 6/2010 | Dayasindhu et al. | |
| 2010/0280962 A1* | 11/2010 | Chan | G06Q 10/103 705/301 |
| 2011/0313801 A1* | 12/2011 | Biewald | G06Q 10/06 705/7.12 |
| 2013/0066961 A1* | 3/2013 | Naik | G06Q 10/10 709/204 |
| 2013/0317871 A1 | 11/2013 | Kulkarni et al. | |
| 2014/0095242 A1 | 4/2014 | Helbok | |
| 2014/0122188 A1* | 5/2014 | Van Pelt | G06Q 10/063112 705/7.42 |
| 2014/0156325 A1* | 6/2014 | Stewart | G06Q 50/01 705/7.13 |
| 2014/0172417 A1 | 6/2014 | Monk | |
| 2014/0214467 A1* | 7/2014 | Asur | G06Q 10/063112 705/7.14 |
| 2014/0229413 A1 | 8/2014 | Dasgupta et al. | |
| 2014/0278657 A1 | 9/2014 | Horvitz et al. | |
| 2014/0358605 A1 | 12/2014 | Balamurugan | |
| 2015/0007181 A1* | 1/2015 | Saraschandra | G06Q 10/06 718/100 |
| 2015/0178134 A1 | 6/2015 | Dai | |
| 2015/0213360 A1 | 7/2015 | Venanzi | |
| 2015/0254595 A1* | 9/2015 | Bank | G06Q 10/06311 705/7.14 |
| 2016/0132816 A1 | 5/2016 | Lush | |
| 2016/0140477 A1 | 5/2016 | Karanam | |
| 2016/0210126 A1* | 7/2016 | Singh | G06F 8/34 |
| 2017/0039505 A1* | 2/2017 | Prabhakara | G06Q 10/063112 |
| 2017/0061357 A1* | 3/2017 | Dubey | G06Q 40/12 |
| 2017/0255999 A1* | 9/2017 | Amaral | G06Q 40/08 |
| 2018/0114159 A1 | 4/2018 | Dubey et al. | |
| 2018/0349829 A1* | 12/2018 | Peterson | G06Q 10/107 |
| 2019/0057335 A1 | 2/2019 | Peyer | |

OTHER PUBLICATIONS

Yuen M., et al., "Task Matching in Crowdsourcing," 2011 International Conference on Internet of Things and 4th International Conference on Cyber, Physical and Social Computing, Oct. 2011, pp. 409-412. [online], [retrieved on May 29, 2019] Retrieved from the Internet:[URI:https://ieeexplore.ieee.org/abstractidocument6142254].

Wikipedia, "Crowdsourcing", http://web.archive.org/web/20071016231656/https://en.wikipedia.org/wiki/Crowdsourcing, Oct. 11, 2007, 3 pages.

Howe, J, The Rise of Crowdsourcing, Wired Magazine, Jun. 1, 2006, 11 pages.

Howe, J, "Crowdsourcing: Why the Power of the Crowd is Driving the Future of Business", The International Achievement Institute, 2008, 9 pages.

Church, Kenneth Ward, "Word Association Norms, Mutual Information, and Lexicography," Computational Linguistics, vol. 16, No. 1, Mar. 1990, pp. 22-29.

Margaret Rouse "Gig Economy", Httg://whatis.techtargetcomfdefinitionigig-economy, Jun. 8, 2016-Mar. 16, 2017 (6p), last accessed Jun. 20, 2017.

Thaun, et al. "Factors Influencing the Decision to Crowdsource: A Systematic Literature Review," Jun. 2015, 34 pages.

Software Testing Help, "The Definitive Guide to Crowdsourced Testing (for Testers and Companies),"http://web.archive.org/web/20150628171431/http://www.softwaretestinghelp.com/guide-to-crowdsourced-testing/>, Jun. 28, 2015, 14 pages.

Speidel et al. "Enterprise Crowd TestinQ," Mar. 2014, TE TestinQ Experience, 6 pages.

Zogai et al. "Managing Crowdsourced Software Testing: A Case Study Bases Insight on the Challenges of a Crowdsourcing Intermediary," Apr. 2014, Article in Journal of Business Economics, 32 pages.

* cited by examiner

CROWD SOURCED RESOURCES AS SELECTABLE WORKING UNITS

TECHNICAL FIELD

This application relates to management of crowd sourced projects, including the allocation of a selected cell group of resources for executing distinct project tasks included in a complex crowd sourced project. This application further relates to communication with, and control over, the geographically distributed resources.

BACKGROUND

The global proliferation of high speed communication networks has created unprecedented opportunities for geographically distributed resource interaction. However, while the opportunities exist and continue to grow, the realization of those opportunities has fallen behind, and new technical problems arise from the utilization of the geographically distributed resources. In part, this is due to the technical challenges that arise when connecting the geographically distributed resources together as part of a team of crowd sourced resources in an effective operational environment to accomplish a common project.

DETAILED DESCRIPTION

Figure 1:
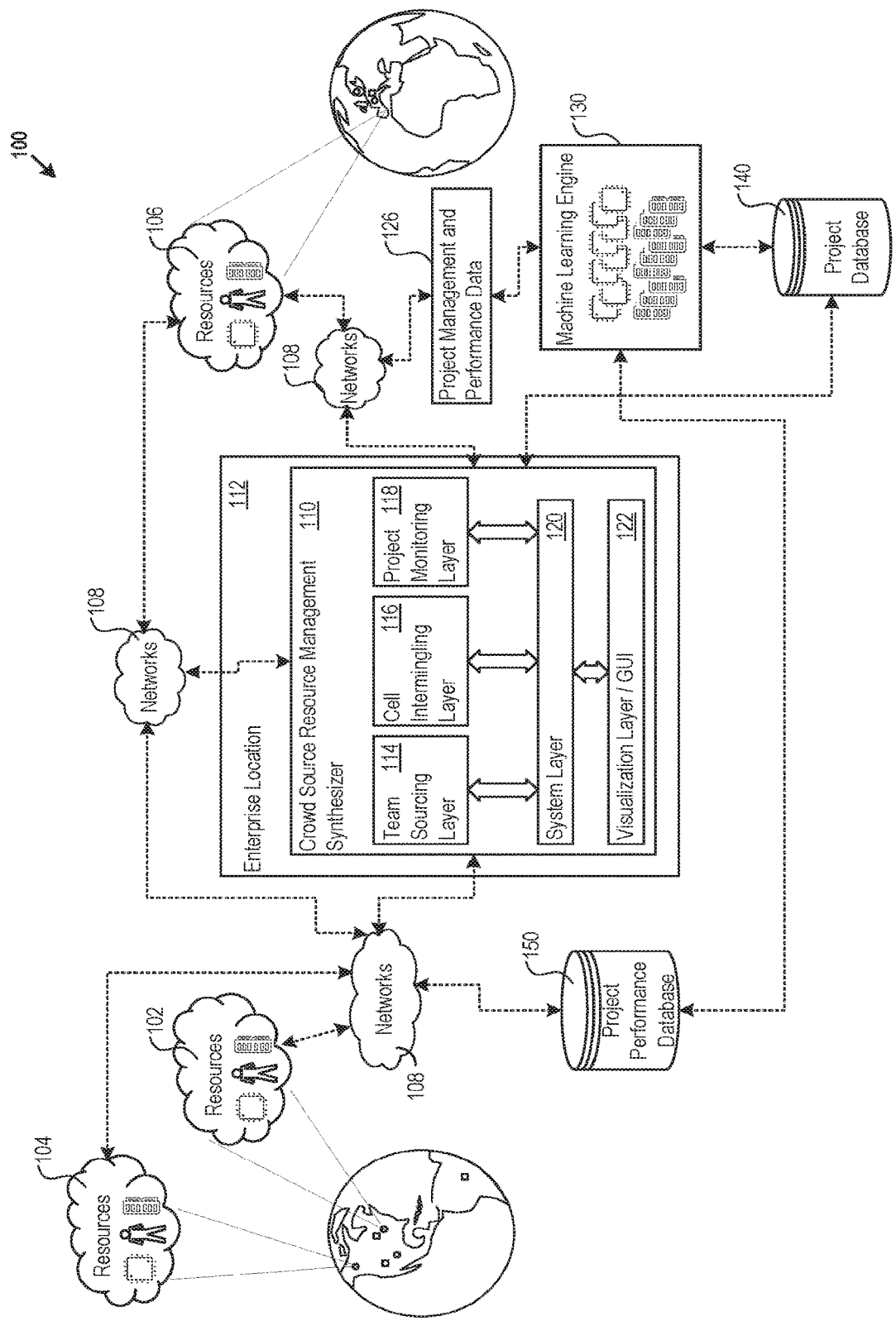
FIG. 1 shows an example of a global network architecture.

With the continued improvements in network capabilities, the technological field of crowd sourcing is now applied to many enterprise projects. With the new emergence of crowd sourcing resources, new technical problems have also emerged that arise from the particular application of crowd sourcing resources. The newfound benefits and efficiencies of bringing together geographically remote resources, also come with newfound issues arising from allocating remote resources that have not previously been asked to work together to accomplish a project. For example, crowd sourcing is applicable where project tasks are posted to an online labor market to attract crowd sourced resources with appropriate qualifications. For such crowd sourced projects, resources that are determined to be qualified for the posted project tasks may be automatically alerted, thus allowing the resources to respond by indicating their interest in the project, and then online tools may help a project manager select the right combination of resources for the project tasks. A common problem encountered by project managers of crowd sourced projects occurs during the step of selecting an optimum team of resources that will work effectively together to accomplish the project goals.

To address these new technical challenges arising from the field of crown sourced projects, a crowd sourced resource management synthesizer (CSRMS) is provided that generates a collaborative work environment permitting the geographically disbursed resources to interact efficiently to successfully accomplish complex projects. To accomplish these solutions, the CSRMS monitors a performance of specific cell groups of resources as the cell groups accomplish designated tasks that make up a project. A cell is defined as a distinguishable group of resources that have worked together in the past, or is predicted to work together on future projects. The resources in a cell may have frequently worked together in the past, and accumulated a known performance level and/or score for certain defined project tasks. Cells may be combined with other individual resources or cells to accomplish larger projects. Cells are typically employed to accomplish tightly-connected chunks of work within a project that requires close collaboration within the resources included in the cell. The collaboration requirements between cells included on a project are assumed to be looser, allowing for cells that are unfamiliar with each other to combine chunks of work they produce without lots of experience working with the other cells.

The CSRMS further monitors a performance of the cell groups as they hand off their finished tasks to an adjacent (i.e., next) cell of resources. The performance data is used by the CSRMS to identify specific cell groups of resources that show a proficiency for working well together to efficiently complete distinct project tasks. Certain resources may also advertise themselves as a distinct cell group The CSRMS further references the performance data to generate project templates for defined projects, where the project templates include a preset distribution of project tasks assigned to preferred cell groups of resources that are predicted to accomplish the project within an acceptable performance threshold. The project templates may be identified by one or more project parameters describing project attributes of the project. Project attributes may include project technology field, project industry field, project name, project requirements, target platform on which a product will run, functional categories for the project, development methodology for the project, or other definable project attribute. The CSRMS further assigns packaged cell groups of resources to designated project tasks based on one or more factors such as previous work history of the cell groups on similar, or same, project tasks, predicted performance of cell groups within the overall team of resources assigned to the project, and an availability of resources.

Although the exemplary embodiments described herein relate to a crowd sourced project for developing a software-type application, the management features described herein are also applicable to crowd sourced projects related to a broader array of projects such as event planning and manual enterprise work products such as tax form preparation, legal analysis, or other process that may be accomplish through the use of resources that have been grouped into defined cells to promote greater efficiencies.

Figure 2:
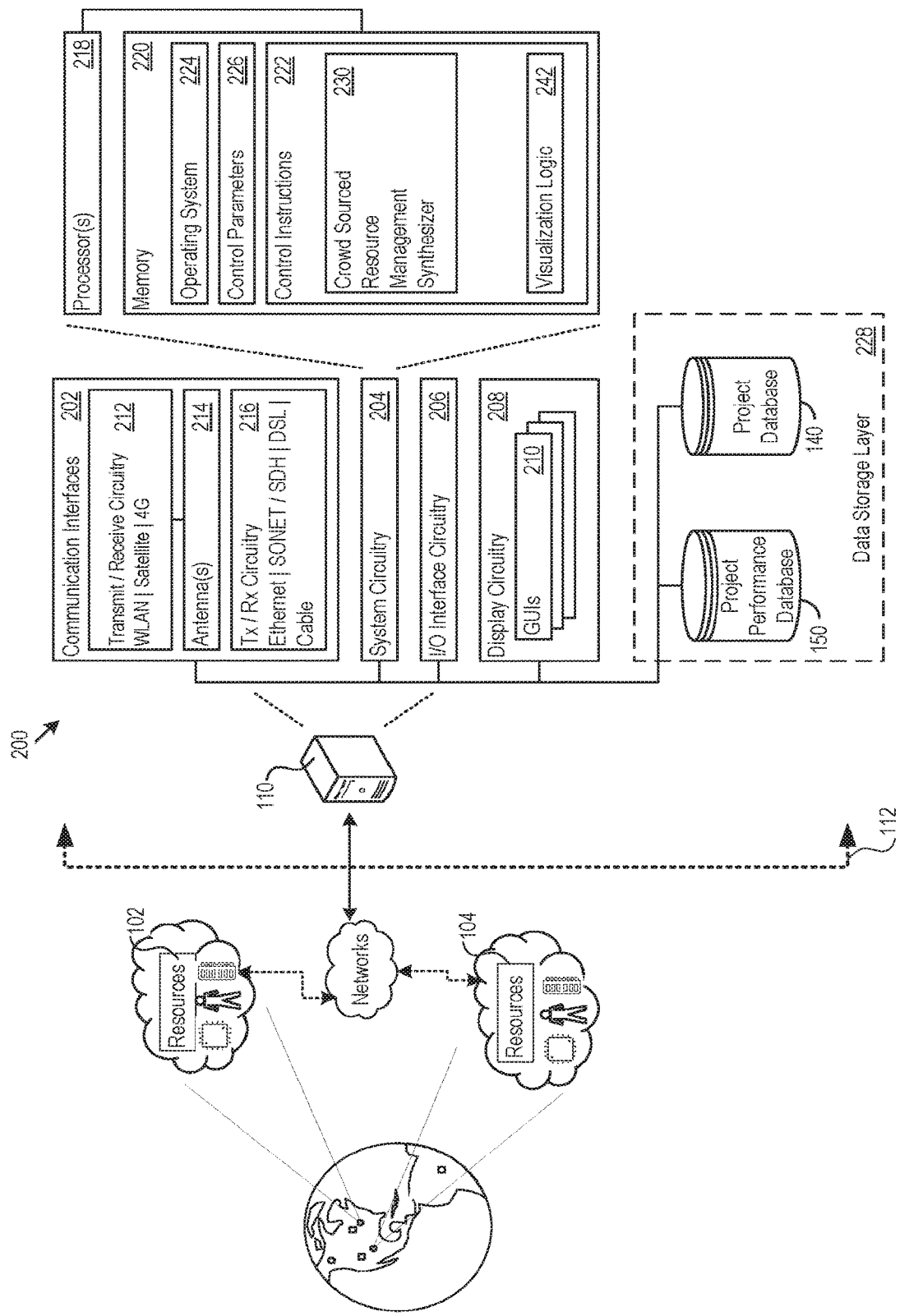
FIG. 2 illustrates an example implementation of a computing resource included in the global network architecture.

FIGS. 1 and 2 provide an example context for the discussion below of the technical solutions in a CSRMS architecture. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are resources, e.g., the cell group of resources 102, 104, and 106. These resources may be present at many different resource sites globally, and for certain types of resources (e.g., virtualized computing resources) the resource sites are service providers that host the resources. The resource sites and resources may be located in any geographic region, e.g., United States (US) East, US West, or Central Europe. Resources may correspond to any element of project execution, whether specific individuals (e.g., a GUI programmer), hardware resources (e.g., CPU, memory and disk resources), or software resources (e.g., algorithm or function packages, application software, operating systems, or database management systems). In addition, any of the resources and resource sites may provide resource descriptors for the resources. The resource descriptors may include data that characterizes, defines, or describes the resources. A few examples of resource descriptors include data specifying abilities, speed, reliability, location, availability, languages, cost, capability, capacity, experience, skill descriptors, historical performance data, and execution capability data. In addition to being geographically distributed, resources and resource descriptors may also be present locally within an enterprise framework that is carrying out a project.

Throughout the global network architecture 100 are networks, e.g., the network 108. The networks 108 provide connectivity between the resources, resource descriptors, service providers, enterprises, and other globally positioned entities. The networks 108 may include private and public networks defined over any pre-determined and possibly dynamic internet protocol (IP) address ranges. The network 108 may be representative of one or more networks.

A CSRMS architecture ("architecture") 110 is hosted at an enterprise location 112, or other third-party vendor site, where the architecture 110 includes the components (e.g., hardware, software, circuitry) for operating the CSRMS. The enterprise location 112 acts as a centralized control point over the processes executed by the CSRMS to carry out project management over the geographically distributed resources. The project may be one that the enterprise itself needs to accomplish, though in other instances the enterprise location 112 may provide centralized control over complex projects for third parties. As will be described in more detail, the CSRMS is executed on the architecture 110 to allocate a team of cell groups of resources to a project and monitor the team's performance during and after completion of the project.

In the global network architecture 100 shown in FIG. 1, the architecture 110 includes a team sourcing layer 114, a cell intermingling layer 116, and a project management layer 118. Each of the layers include the hardware, software, and circuitry for implementing the respective corresponding features attributed to the layers described herein. A system layer 120 coordinates the operation and interactions among the team sourcing layer 114, the cell intermingling layer 116, and the project management layer 118. In addition, the system layer 120 drives a visualization layer 122 that renders or outputs, for instance, a set of graphical user interfaces (GUIs) including visualizations and presentation of information that facilitate process execution among the resources, e.g. in HTML form or as digital video signals for driving displays.

The global network architecture 100 also includes a project database 140 storing profiles for known individual resources, where the resource profiles include at least the respective resource descriptor information and project work history. The project database 140 also stores profiles for cell groups of resources managed by the CSRMS. The cell group profiles include the resource descriptor information for the resources that are part of the respective cell group, as well as a project work history for the cell group. By referencing the distinct cell groups and their project work history, the CSRMS may more efficiently predict and assign the cell groups to future projects and project tasks when the cell groups have shown a history of successfully completing similar, or the same, tasks in their work history.

In some embodiments, certain cell groups may present themselves as a pre-packaged team of resources specializing in accomplishing certain tasks. The cell group profiles stored in the project database 140 for such pre-packaged cell groups include identification data flagging the purported specializations. Each cell group profile may identify resources included in the cell group, as well as past project work history and performance of the cell group. The CSRMS then considers such specializations when allocating resources during management of a future project. Reference to a resource may be understood to be a reference to a singular resource or a cell group of resources.

The project database 140 may also store a library of preset project templates. Each preset project template applies to a specific type of project (e.g., creating an email server, or crating an application for analyzing an electronic insurance claim and determining a reimbursement amount), and includes a list of defined project tasks that comprise a workflow for accomplishing the specific type of project. In addition, the project template may further include a recommended project task assignment table that assigns predetermined resources (e.g., a predetermined cell group of resources) to each of the defined project tasks.

Figure 9:
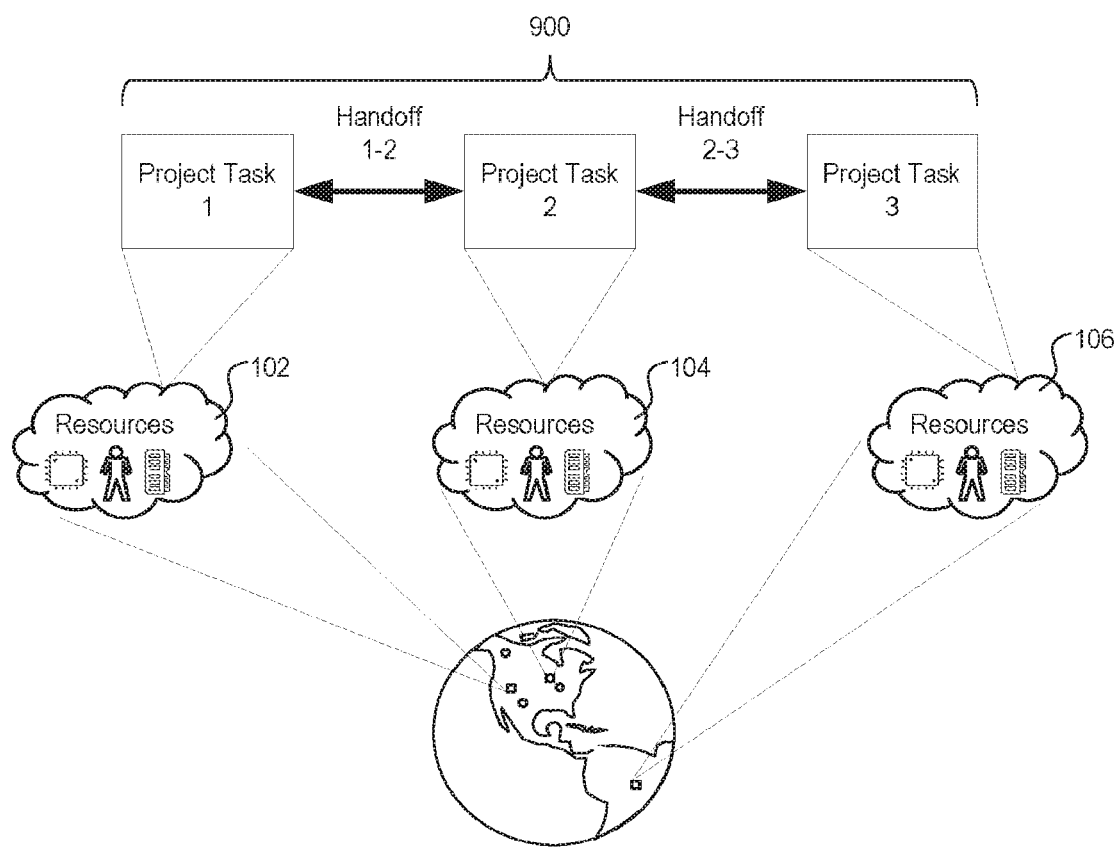
FIG. 9 shows an exemplary workflow including distinct project tasks, where each project task is assigned to a corresponding resource.

FIG. 9 shows an exemplary workflow 900 that may be included in a project template. The workflow 900 represents a project including three distinct project tasks: project task 1, project task 2, and project task 3. The workflow 900 further shows a specific cell group of resources assigned to each project task: cell group 102 is assigned to project task 1, cell group 104 is assigned to project task 2, and cell group 106 is assigned to project task 3. The workflow 900 also shows a relationship between adjacent project tasks in the handoff of completed work product. For example, the completed work product from project task 1 is handed off as an input to adjacent project task 2, and the completed work product from project task 2 is handed off as an input to adjacent task 3. The handoff relationships is also a representation of work handed off between the respective adjacent cell group of resources. For example, the completed work product of cell group 102 (from finishing project task 1) is handed off to adjacent cell group 104, so that cell group 104 may use the finished work product from adjacent cell group 102 to complete their own respective project task 2.

The global network architecture 100 also includes a project performance database 150 that stores performance data for each resource, and cell group of resources, having completed a project task under the CRMS. After completion of a project, performance statistics describing an overall performance of the resources as they worked through their assigned project tasks may be calculated by the CRMS and stored on the project performance database 150. The performance statistics may be calculated by the CRMS for each cell group of resources, as well as for individual resources.

The performance statistics may be in the format of a score generated based on a number of factors such as a time to complete the project task compared against a historical average time to complete the same, or similar, project task, a number of defects found in the completed project task, as well as peer resource evaluations. In addition or alternatively, the score may be generated in view of software efficiency measured by performance metrics, space required, readability of code, or other measurable metric. When the crowd sourced project is not related to software application development, the score may be generated based on other performance metrics that are measurable to the crowd sourced project. Although both the project database 140 and the project performance database 150 are shown as two distinct components in the global network architecture 100 shown in FIG. 1, according to some embodiments the project database 140 and the project performance database 150 may be part of a single database.

The global network architecture 100 also includes a machine learning engine 130. The machine learning engine 130 is provided with project management and performance (PMP) data 126 from the CSRMS running on the architecture 110. The project management data includes at least the data stored on the project database 140, and the project performance data includes at least the data stored on the project performance database 150. The machine learning engine 130 may also obtain project management data directly from the project database 140, and obtain project performance data directly from the project performance database 150. By analyzing the project management data and/or the project performance data, the machine learning engine 130 monitors the progression of a project that utilizes crowd sourced resources.

The machine learning engine 130 identifies a project by parsing project profile data included in the PMP data 126. The project profile data may include a project name, project field/industry, project goal, project requirements, project resources (e.g., resources and cell groups that comprise the overall project team, virtual machines, and the like), project location, or the like for characterizing a corresponding project. The machine learning engine 130 may further monitor and track progression of the project by identifying each project task comprising the project, and tracking an order in which each project task is accomplished during the duration of the project from the PMP data 126 received from the CSRMS.

As the machine learning engine 130 monitors the progression of the project, the machine learning engine 130 receives specific performance statistics included in the PMP data 126 that is received by the machine learning engine 130. The performance statistics may be comprised of a performance score input by a project manager, fellow project team resource member, or client. The performance score is applicable to the overall project team, a cell group of resources included in the project team, and/or individual resources utilized during the project.

The performance statistics may further be comprised of an adjacent performance rating generated by the machine learning engine 130 or CSRMS, where the adjacent performance rating reflects an effectiveness of handing off work product between two adjacent cell groups. The machine learning engine 130 considers the received PMP data 126, the received performance statistics, as well as any other data obtainable from the project performance database 150 and the project database 150, to propose updated project templates and resource assignments. The generated updated proposals are stored in the project performance database 140 as revised project templates.

FIG. 2 shows an example implementation of the architecture 110 as implemented on a computer device 200. The architecture 110 includes communication interfaces 202, system circuitry 204, input/output (I/O) interface circuitry 206, and display circuitry 208. The visualization layer 122 generates the graphical user interfaces (GUIs) 210 locally using the display circuitry 208, or for remote visualization, e.g., as HTML, JavaScript, audio, and video output for a web browser running on a local or remote machine. Among other interface features, the GUIs 210 may render interfaces for project task planning, inter-resource communication, requests for resource allocations, execution of tools in a dynamic workspace, and other features of the CSRMS.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality in the architecture 110, including the team sourcing layer 114, the cell intermingling layer 116, and the project management layer 118, the system layer 120, and the visualization layer 122. As just one example, the system circuitry 204 may include one or more instruction processors 218 and memories 220.

The memories 220 store, for example, control instructions 222 and an operating system 224. In one implementation, the processor 218 executes the control instructions 222 and the operating system 224 to carry out any desired functionality for the architecture 110, including the functionality described below for the team sourcing layer 114, the cell intermingling layer 116, the project management layer 118, the system layer 120, and the visualization layer 122. The control parameters 226 provide and specify configuration and operating options for the control instructions 222, operating system 224, and other functionality of the architecture 110.

The architecture 110 may include a data storage layer 228 that hosts any number of local data repositories. In the exemplary computer device 200 shown in FIG. 2, the data storage layer 228 includes the project database 140 and the project performance database 150. Although both the project database 140 and the project performance database 150 are shown as two distinct components, according to some embodiments the project database 140 and the project performance database 150 may be part of a single database.

The control instructions 222 drive the functionality of the architecture 110. For example, the control instructions 222 include instructions 230 for implementing the features of the CSRMS. The visualization logic 242 generates the GUIs 210 to provide interfaces for accomplishing features of the CSRMS.

The features of the CSRMS that control operation of the various components of the computer device 200, as well as the structure and content of the generated GUIs 210, improve the functioning of the underlying computer hardware included in the computer device 200 itself. That is, these features (among others described below) are specific improvements in the way that the underlying computer device 200 operates. The improvements facilitate more efficient, accurate, consistent, and precise execution of complex projects using disparate geographically distributed resources. The improved functioning of the underlying computer hardware itself achieves further technical benefits. For example, the execution of the CSRMS on the architecture 110 increases project task completion efficiency by allocating proven cell groups of resources to accomplish specific project tasks the cell groups are predicted to accomplish at a high performance level.

Figure 3:
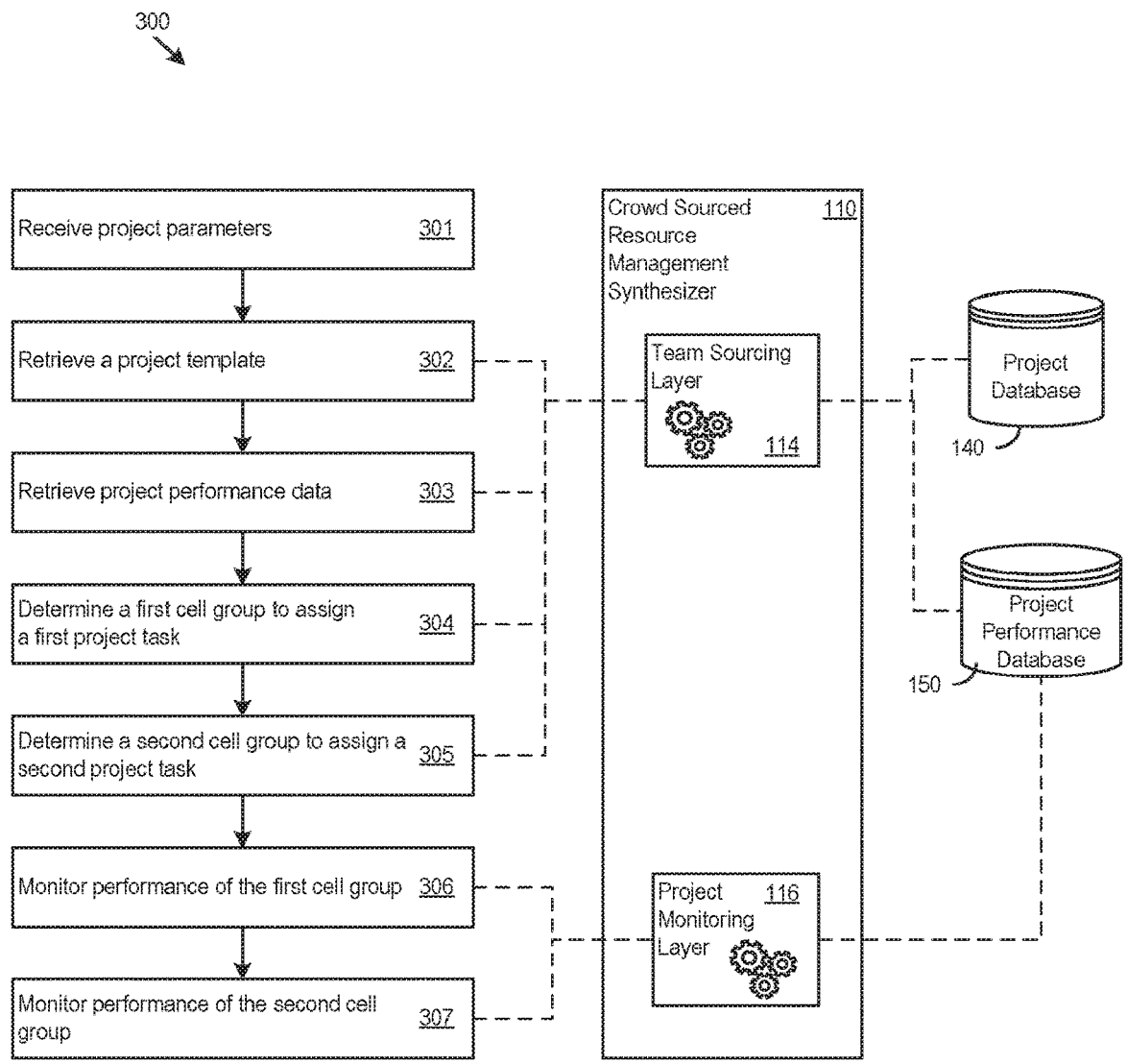
FIG. 3 shows an exemplary flow diagram of logic that the architecture may implement.

FIG. 3 shows a flow diagram 300 of logic describing an exemplary process for managing a crowd sourced project by the CSRMS. In one implementation, the CSRMS receives a set of project parameters describing a project tasked for completion (301). The project parameters may, for example, be received directly from a client computer, or input by a project manager resource directly into an input device included in the architecture 110. The project parameters may include, for example, a project name, project field/industry, project goal, project requirements, project location, or the like for characterizing the corresponding project.

After receiving the project parameters, the team sourcing layer 114 of the CSRMS parses the project database 140 to retrieve a project template identified using the information included in the project parameters (302). For example, the project name and/or project field/industry information included in the project parameters may be referenced to identify the project template. The project template includes a workflow comprised of a number of project tasks for completing the project. The project template also includes a mapping of recommended cell groups of resources for allocating to complete specific project tasks.

The team sourcing layer 114 further parses the project performance database 150 to retrieve project performance data relating to the past performance on similar, or the same, projects by the cell groups of resources identified in the project template (303). In addition to the specific performance of cell groups and resources, the team sourcing layer 114 further references the project performance data to determine how adjacent cell groups identified in the project template have worked together in past projects. Specifically, the team sourcing layer 114 references the project performance data to determine how the adjacent cell groups have performed when handing off work product between themselves.

The team sourcing layer 114 further determines a first cell group to assign to a first project task included in the project workflow (304). The first cell group may be the recommended cell group identified in the project template, or another known cell group selected by the team sourcing layer 114 based on the project performance data or other considered factors (e.g., geographic proximity of adjacent cell groups, availability of resources).

The team sourcing layer 114 further determines a second cell group to assign to a second project task included in the project workflow (305). The second cell group may be the recommended cell group identified in the project template, or another known cell group selected by the team sourcing layer 114 based on the project performance data or other considered factors (e.g., geographic proximity of adjacent cell groups). The process for determining a cell group to assign to a project tasks included in the project workflow goes on until each project task has been assigned a cell group or resource.

After commencing the project, the project monitoring layer 118 of the CSRMS monitors a performance of the first cell group (306). The resulting performance statistics generated by the project monitoring layer 118 is stored, for example, on the project performance database 150.

After commencing the project, the project monitoring layer 118 of the CSRMS monitors a performance of the second cell group (307). The resulting performance statistics generated by the project monitoring layer 118 is stored, for example, on the project performance database 150. The project monitoring layer 118 may monitor each cell group assigned to complete a project task until the project is determined to be completed.

The project monitoring layer 118 may also utilize the machine learning engine 130, to identify new cell groups of resources that are a combination of existing resources and cell groups of resources. The determined composition of the new cell groups of resources may be based on the observed performance of the resources and cell groups of resources in past and current projects, requests to create new cell groups received from the resources themselves, and/or a calculated need to create new cell groups to more effectively complete known project tasks or future project tasks in a work queue. The determined composition of the new cell groups may include new combinations of resources, or selectively remove, or add, resources to existing cell groups. The new cell groups may be determined by the project monitoring layer 118 and/or machine learning engine 130 as performing a distinct project task above a threshold performance level.

Figure 4:
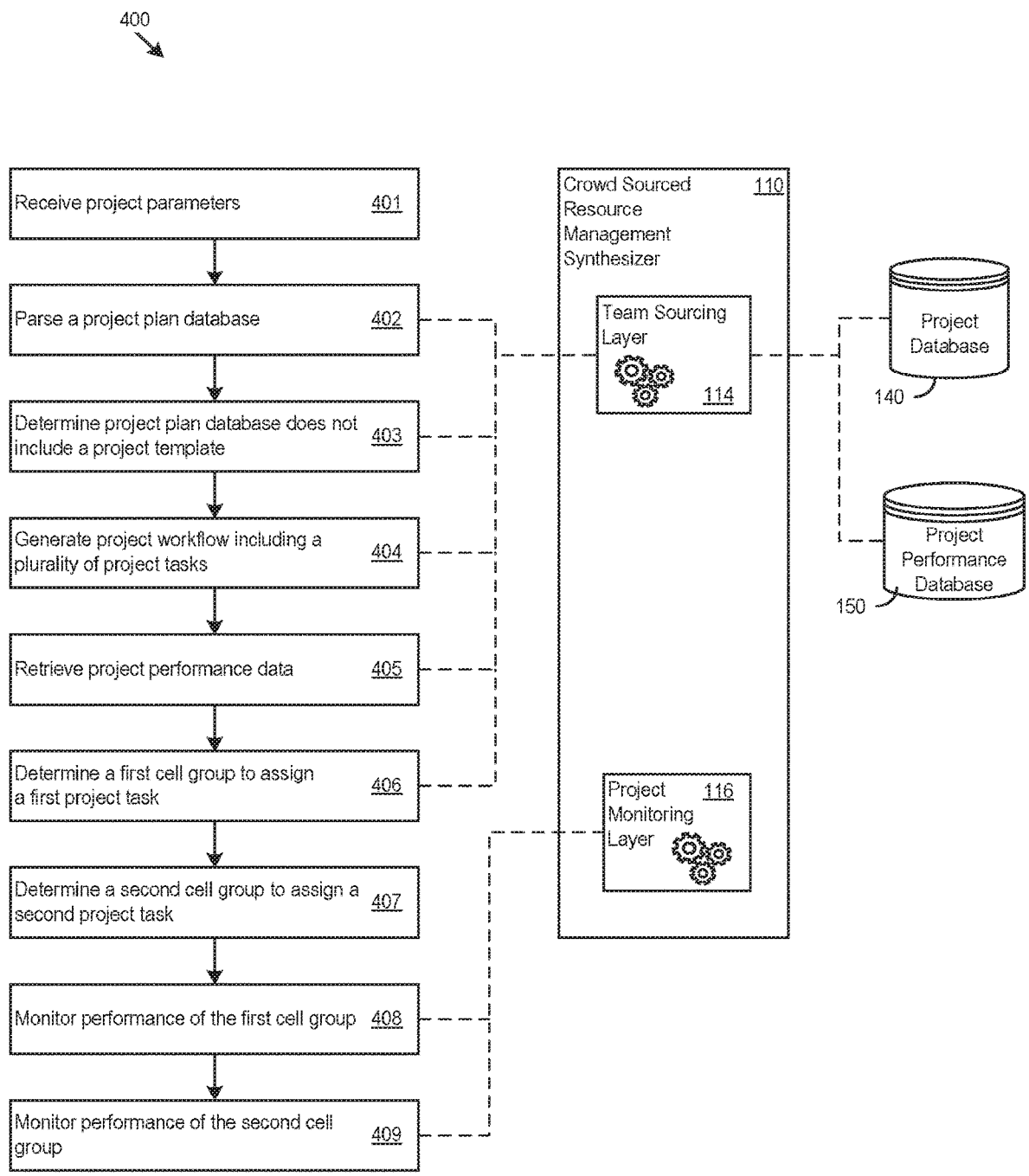
FIG. 4 shows another exemplary flow diagram of logic that the architecture may implement.

FIG. 4 shows a flow diagram 400 of logic describing another exemplary process for managing a crowd sourced project by the CSRMS. In one implementation, the CSRMS receives a set of project parameters describing a project tasked for completion (401). The project parameters may, for example, be received directly from a client computer, or input by a project manager resource directly into an input device included in the architecture 110. The project parameters may include, for example, a project name, project field/industry, project goal, project requirements, project location, or the like for characterizing the corresponding project.

After receiving the project parameters, the team sourcing layer 114 of the CSRMS parses the project database 140 in an attempt to identify a project template using the information included in the project parameters (402). However, in this embodiment a project template cannot be identified from the parsing of the project database 140 (403). This may indicate that resources under the CSRMS have not previously worked on a similar, or the same, project.

Without a project template describing a project workflow, the team sourcing layer 114 is responsible for generating a project workflow for the project that includes a number of distinct project tasks for assigning to cell groups of resources (404). The team sourcing layer 114 may rely on project attributes from similar projects to generate the project workflow. In addition or alternatively, the team sourcing layer 114 may receive instructions for generating the project workflow that create each of the project tasks that comprise the project workflow. After generating the project tasks, the team sourcing layer 114 may present a notice to the known resources about the available project tasks that are looking for resource assignments.

The team sourcing layer 114 further parses the project performance database 150 to retrieve project performance data relating to the past performance on similar, or the same, projects by the cell groups of resources identified in the project template (405). In addition to the specific performance of cell groups and resources, the team sourcing layer 114 further references the project performance data to determine how adjacent cell groups identified in the project template have worked together in past projects. Specifically, the team sourcing layer 114 references the project performance data to determine how the adjacent cell groups have performed when handing off work product between themselves.

The team sourcing layer 114 further determines a first cell group to assign to a first project task included in the project workflow (406). The first cell group may be a known cell group selected by the team sourcing layer 114 based on the project performance data or other considered factors (e.g., geographic proximity of adjacent cell groups). In addition or alternatively, the team sourcing layer 114 may select the first cell group based on responses received from cell groups in response to the notice sent out to the known resources. For example, a cell group of resources with previous work experience on a similar, or same, project task as the first project task may have submitted a bid to be assigned to the first project task.

T The team sourcing layer 114 further determines a second cell group to assign to a second project task included in the project workflow (407). The second cell group may be a known cell group selected by the team sourcing layer 114 based on the project performance data or other considered factors (e.g., geographic proximity of adjacent cell groups). In addition or alternatively, the team sourcing layer 114 may select the second cell group based on responses received from cell groups in response to the notice sent out to the known resources. For example, a cell group of resources with previous work experience on a similar, or same, project task as the second project task may have submitted a bid to be assigned to the second project task.

After commencing the project, the project monitoring layer 118 of the CSRMS monitors a performance of the first cell group (408). The resulting performance statistics generated by the project monitoring layer 118 is stored, for example, on the project performance database 150.

After commencing the project, the project monitoring layer 118 of the CSRMS monitors a performance of the second cell group (409). The resulting performance statistics generated by the project monitoring layer 118 is stored, for example, on the project performance database 150. The project monitoring layer 118 may monitor each cell group assigned to complete a project task until the project is determined to be completed.

Figure 5:
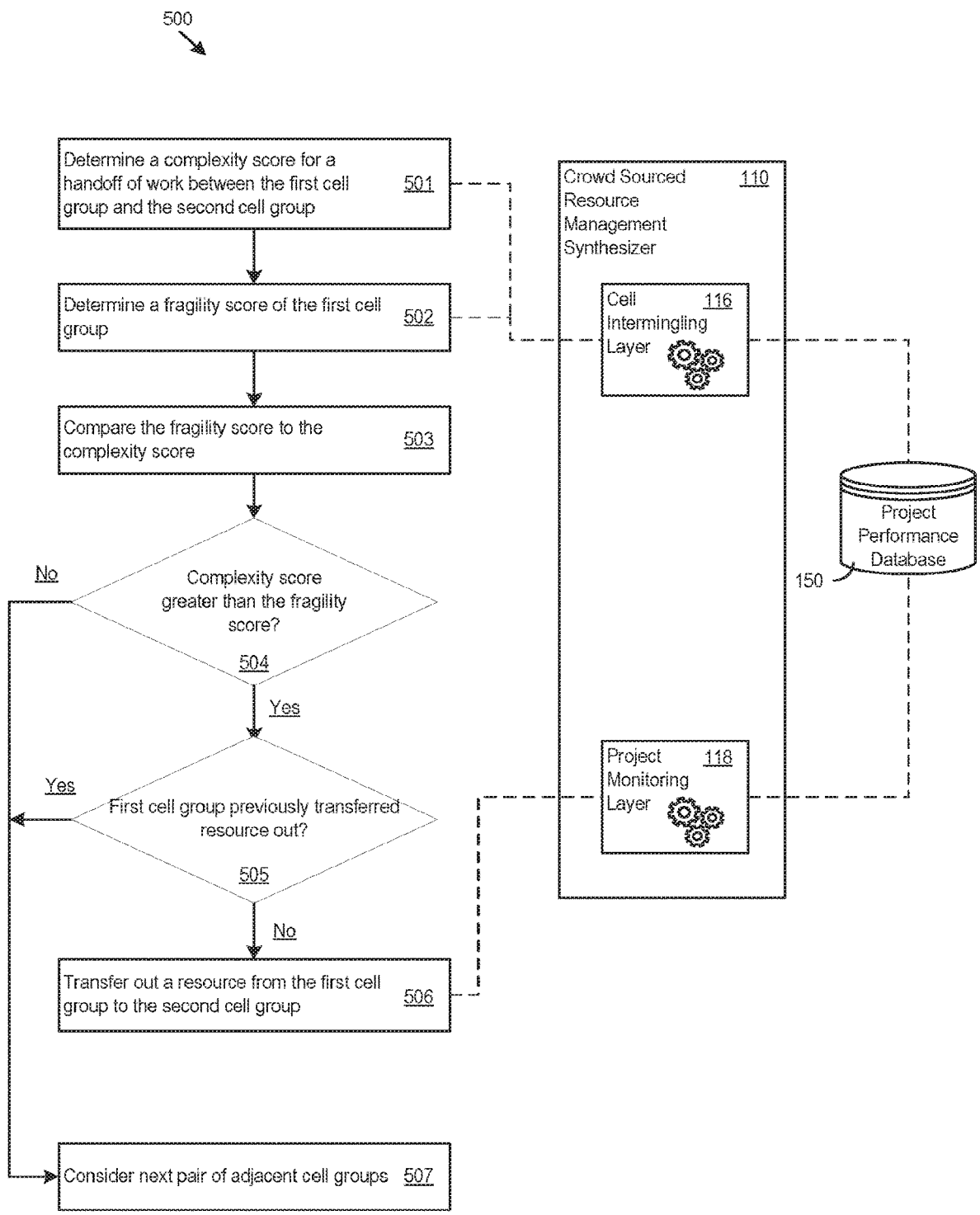
FIG. 5 shows another exemplary flow diagram of logic that the architecture may implement.

FIG. 5 shows a flow diagram 500 of logic describing another exemplary process for managing a crowd sourced project by the CSRMS. In one implementation, the process described by flow diagram 500 is implemented by the cell intermingling layer 116 of the CSRMS while finalizing mapping of cell groups of resources to project tasks comprising a project. After an initial allocation of cell groups have been assigned to their respective project tasks, the cell intermingling layer 116 determines a complexity score related to a work handoff between a first cell group and a second cell group from the initial allocation of cell groups (501). The exemplary workflow 900 shown in FIG. 9 represents the initial allocation of cell groups to their assigned project tasks. So the complexity score may represent an efficiency of the work handoff from cell group 102 to cell group 104. The complexity score may be a number between 0 and 1, where 1 is indicative of a greater complexity when exchanging work product between cell group 102 and cell group 104.

The cell intermingling layer 116 further determines a fragility score of a first cell group (502). So for cell group 102, the fragility score is representative of a negative effect on the cell group 102 if a resource from cell group 102 was transferred (i.e., intermingled) with adjacent cell group 104. The intermingling of resources may be considered by the cell intermingling layer 116 in case a predicted work handoff efficiency between the cell group 102 and cell group 104 is lower than a threshold. The fragility score may be a number between 0 and 1, where 1 is indicative of a high fragility.

The cell intermingling layer 116 further compares the complexity score to the fragility score (503). When the complexity score is greater than the fragility score (504), this indicates a greater need to transfer the resource from cell group 102 to cell group 103 to mitigate the high level of complexity between the two cell groups. For example, the transferred resource from cell group 102 may have previously worked within cell group 104, share a common language as cell group 104, share a close geographical location as cell group 104, or share some other connection to cell group 104, thus causing the cell intermingling layer 116 to predict the transfer of the resource into cell group 104 will help reduce the issues causing the complexity between the two cell groups.

The cell intermingling layer 116 further references one or more intermingling rules before determining whether to transfer the resource (505). In this embodiment, the intermingling rule asks whether the first cell group has previously transferred a resource out for intermingling purposes. When the current situation passes the intermingling rules, which in this case is the first cell group not having previously transferred out a resource, the cell intermingling layer 116 controls or allows for the transfer of the resource from the first cell group 102 to the adjacent second cell 104 (506). When the intermingling rules are not satisfied, the cell intermingling layer 116 considers other adjacent cell groups for intermingling (507).

Cell groups that are revised from the intermingling process are updated by the cell intermingling layer 116 on the project workflow, and the updated project workflow is stored on the project database 140 as part of the corresponding project template.

Figure 6:
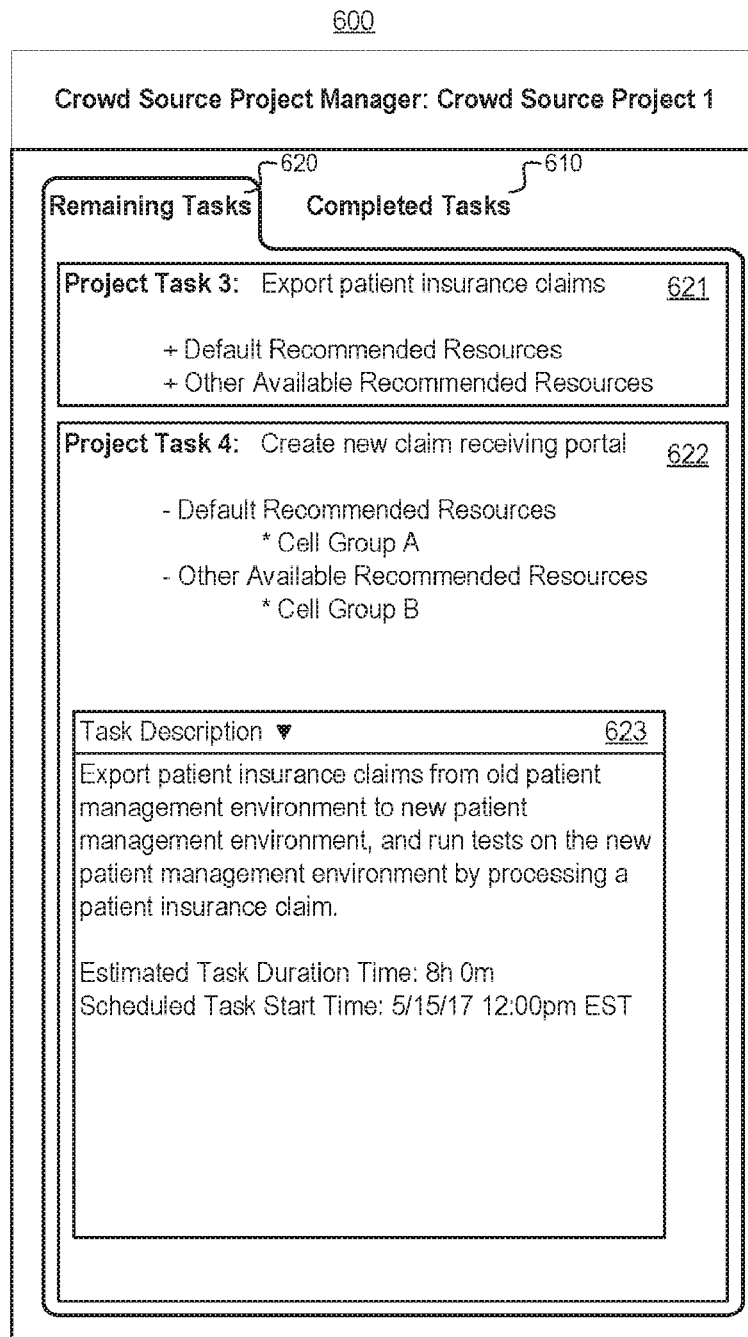
FIG. 6 shows a view of an example graphical user interface (GUI) of a project manager.

FIG. 6 shows an exemplary view of a first management GUI 600 generated by the CSRMS for managing crowd sourced resources in an insurance claims review project. The first management GUI 600 includes a completion tab 610 for displaying a list of completed project tasks (not expressly illustrated). The first management GUI 600 also includes a remaining tab 620 (illustrated) that includes a list of remaining project tasks, including Project Task 3 and Project Task 4. Project Task 3 relates to exporting patient insurance claims from an old patient management environment to a new patient management environment. Project Task 3 is displayed in a third task field 621, where the third task field 621 includes an option to display a list of default recommended resources to assign to Project Task 3, and an option to display a list of other available recommended resources to assign to Project Task 3. The default recommended resources may include cell groups of resources identified on a project template for the project. In addition, the list of other available recommended resources may have also been included on the project template, or the team sourcing layer 114 may generate the list of other available recommended resources based on a detected availability of resources that the team sourcing layer 114 calculates are qualified to accomplish Project Task 3.

Project Task 4 relates to creating a new portal for receiving the patient insurance claims within the new patient management environment. Project Task 4 is displayed in a fourth task field 622, where the fourth task field 622 includes an option to display a list of default recommended resources to assign to Project Task 3, and an option to display a list of other available recommended resources to assign to Project Task 3. The default recommended resources may include cell groups of resources identified on a project template for the project. In addition, the list of other available recommended resources may have also been included on the project template, or the team sourcing layer 114 may generate the list of other available recommended resources based on a detected availability of resources that the team sourcing layer 114 calculates are qualified to accomplish Project Task 3. Here, the default recommended resources identify cell group A from the project template. The fourth task field 622 also identifies cell group B as the other available recommended resources.

The fourth task field 622 also includes a task description field 623 describing Project Task 4, as well as an estimated task duration time describing an estimated amount of time for completing Project Task 4 using the default recommended resource, and a scheduled start time for Project Task 4.

Figure 7:
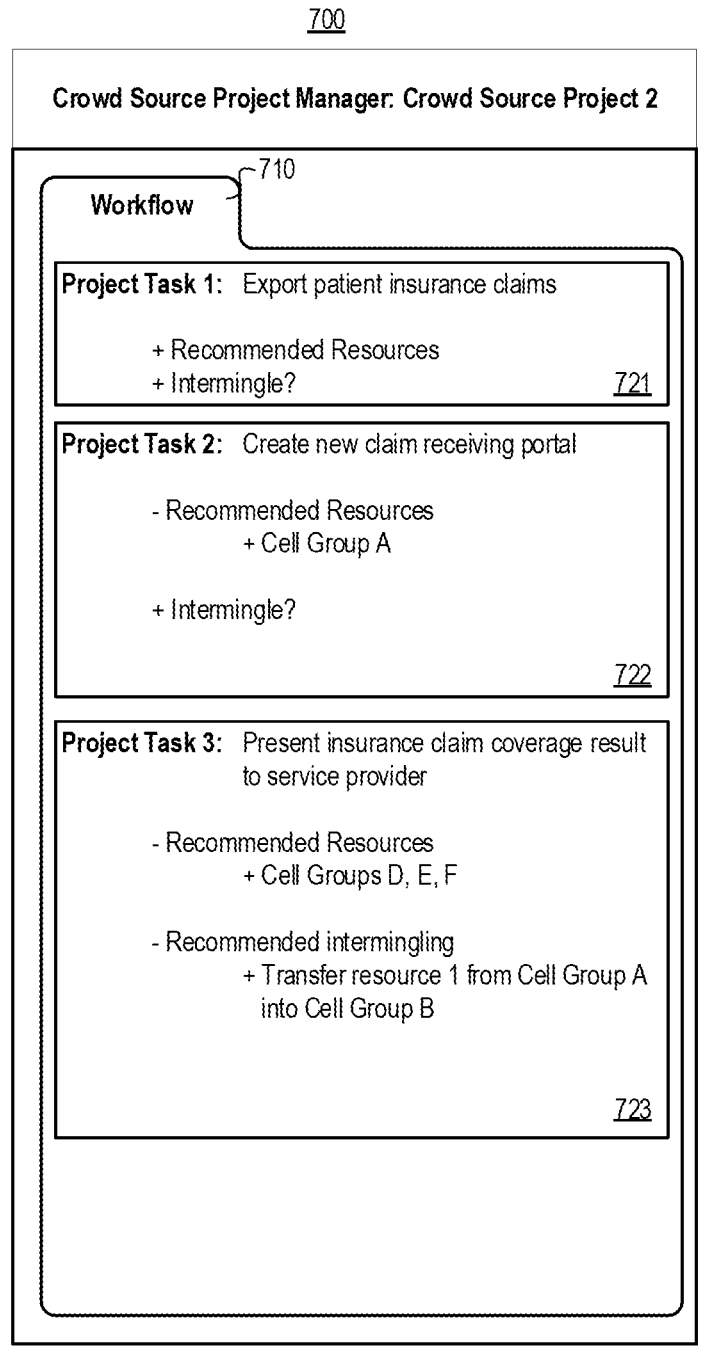
FIG. 7 shows a view of another example graphical user interface (GUI) of a project manager.

FIG. 7 shows an exemplary view of a second management GUI 700 generated by the CSRMS for managing crowd sourced resources in an insurance claims review project by determining when to intermingle resources in adjacent cell groups. The second management GUI 700 includes a workflow tab 710 for displaying a list of project tasks that comprise the project. Here, the workflow tab 710 illustrates the project workflow comprising of three distinct project tasks: Project Task 1, Project Task 2, and Project Task 3.

Project Task 1 relates to exporting patient insurance claims from an old patient management environment to a new patient management environment. Project Task 1 is displayed in a first task field 721, where the first task field 721 includes an option to display a list of default recommended resources to assign to Project Task 1, and an option to run an intermingling analysis. The default recommended resources may include cell groups of resources identified on a project template for the project. When selected, the intermingling option causes the cell intermingling layer 116 to run the intermingling analysis as described by flow diagram 500.

Project Task 2 relates to creating a new portal for receiving the patient insurance claims within the new patient management environment. Project Task 2 is displayed in a second task field 722, where the second task field 722 includes an option to display a list of default recommended resources to assign to Project Task 2, and an option to run an intermingling analysis. The default recommended resources may include cell groups of resources identified on a project template for the project, such as cell group A, cell group B, and cell group C illustrated in the second task field 722. When selected, the intermingling option causes the cell intermingling layer 116 to run the intermingling analysis as described by flow diagram 500.

Project Task 3 relates to presenting insurance claim coverage results to a responsible service provider. Project Task 3 is displayed in a third task field 723, where the third task field 723 includes an option to display a list of default recommended resources to assign to Project Task 3, and an option to run an intermingling analysis. The default recommended resources may include cell groups of resources identified on a project template for the project, such as cell group D, cell group E, and cell group F illustrated in the third task field 723. When selected, the intermingling option causes the cell intermingling layer 116 to run the intermingling analysis as described by flow diagram 500. For example, the third task field 723 illustrates the intermingling option having been selected, and the cell intermingling layer 116 recommending that resource 1 from cell group A transfer into adjacent cell group B.

The workflow tab 710 exemplifies three adjacent project tasks within the project, where the work product from a preceding project task is input to the next adjacent project task for the adjacent project task to be completed by their respective assigned resources. The intermingling option may be run by the cell intermingling layer 116 based on a received input command, or automatically for each adjacent cell group that is initially assigned to the project tasks.

In other embodiments, the project tasks that comprise the project workflow illustrated under the workflow tab 710 may relate to a non-software application development project. For instance, the project may be a marketing campaign where a first cell is allocated to accomplish the high level theme and templates for the marketing campaign, while another second cell is allocated to various local markets or to various media channels.

Figure 8:
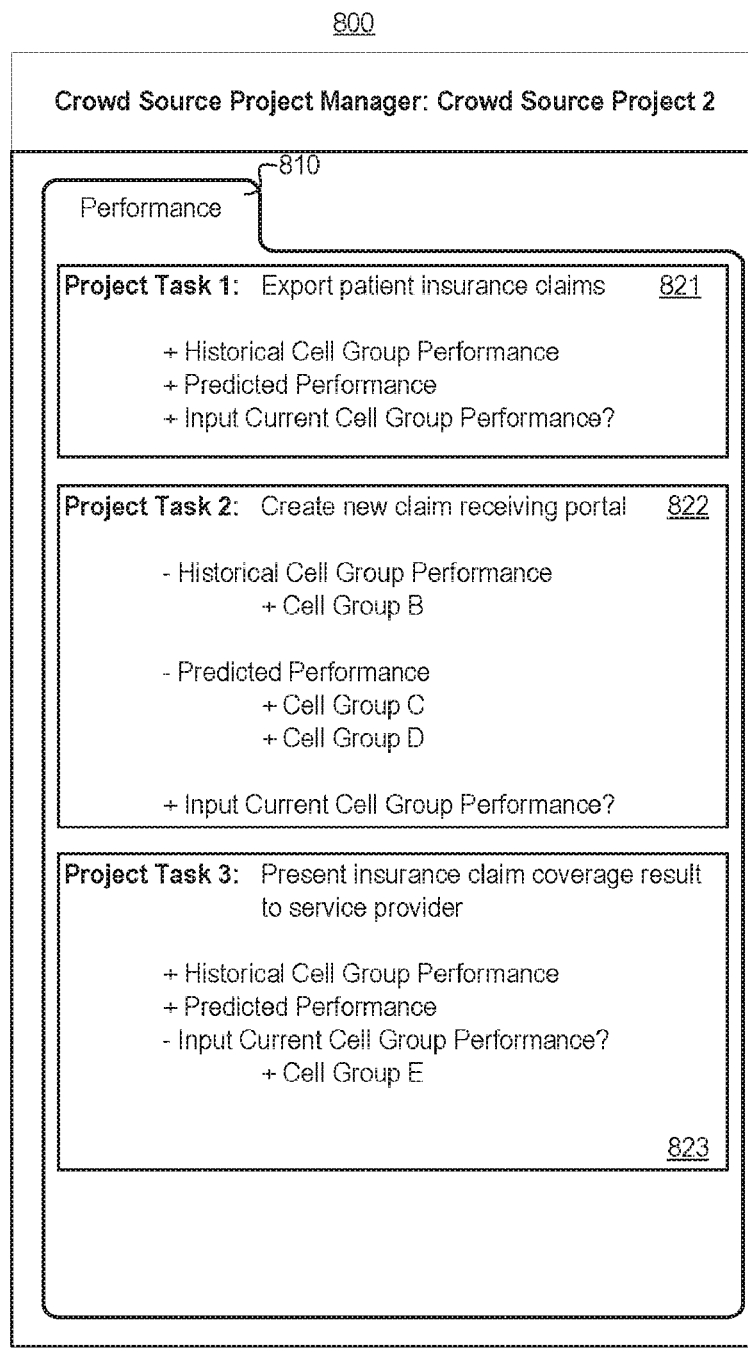
FIG. 8 shows a view of another example graphical user interface (GUI) of a project manager.

FIG. 8 shows an exemplary view of a third management GUI 800 generated by the CSRMS for managing crowd sourced resources in an insurance claims review project by monitoring performance of resources and providing an option to revise a mapping of resources to project tasks. The third management GUI 800 includes a performance tab 810 for displaying a list of project tasks that comprise the project. Here, the performance tab 810 illustrates the project workflow comprising of three distinct project tasks: Project Task 1, Project Task 2, and Project Task 3.

Project Task 1 relates to exporting patient insurance claims from an old patient management environment to a new patient management environment. Project Task 1 is displayed in a first task field 821, where the first task field 821 includes an option to display historical performance statistics for a cell group currently assigned to complete Project Task 1, an option to display predicted performance statistics for a list of recommended resources determined by the team sourcing layer 114 to be potential replacements to assign to Project Task 1, and an option to input performance rating for the cell group currently assigned to Project Task 1.

Project Task 2 relates to creating a new portal for receiving the patient insurance claims within the new patient management environment. Project Task 2 is displayed in a second task field 822, where the second task field 822 includes an option to display historical performance statistics for a cell group currently assigned to complete Project Task 2, an option to display predicted performance statistics for a list of recommended resources determined by the team sourcing layer 114 to be potential replacements to assign to Project Task 2, and an option to input performance rating for the cell group currently assigned to Project Task 2. The current cell group assigned to Project Task 2 is shown to be cell group B. The list of recommended resources to potentially replace the current cell group B, include cell group C and cell group D. The list of recommended resources may have been determined by the team sourcing layer 114 to be potential replacements for cell group B based on a predicted performance calculation for cell group C and cell group D surpassing cell group B.

Project Task 3 relates to presenting insurance claim coverage results to a responsible service provider. Project Task 3 is displayed in a third task field 823, where the third task field 823 includes an option to display historical performance statistics for a cell group currently assigned to complete Project Task 3, an option to display predicted performance statistics for a list of recommended resources determined by the team sourcing layer 114 to be potential replacements to assign to Project Task 3, and an option to input performance rating for the cell group currently assigned to Project Task 3. The current cell group assigned to Project Task 3 is shown to be cell group E. The third task field 823 also shows the option to input performance rating for the current cell group E has been selected.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions 222 read, write, delete, and modify to perform the processing noted herein. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry. Various implementations have been specifically described. However, many other implementations are also possible.

What is claimed is:

1. An enterprise server computer comprising:
   a communication interface configured to:
      communicate with a computing resource, a project plan database, and a project performance database; and
      receive, from the computing resource, project parameters corresponding to an enterprise project;
   project management circuitry coupled to the communication interface, the project management circuitry configured to:
      receive, through the communication interface, the project parameters;
      control the communication interface to retrieve, via a team sourcing layer, from the project plan database, a project template corresponding to the enterprise project wherein the project template includes a predetermined set of distinct project tasks that comprise a workflow for accomplishing the enterprise project;
      control the communication interface to retrieve, via the team sourcing layer, from the project performance database, project performance data for a plurality of resources, the project performance data including a respective resource identifier and resource attributes for the plurality of resources;
      determine, via the team sourcing layer, from the plurality of resources, a first cell group of resources for assigning a first project task included in the project template;
      update the communication interface to display, via a visualization layer, the first cell group of resources as a recommended resource for the first project task;
      determine, via the team sourcing layer, from the plurality of resources, a second cell group of resources for assigning a second project task included in the project template;
      update the communication interface to display, via the visualization layer, the second cell group of resources as a recommended resource for the second project task;
      determine, via a cell intermingling layer, a fragility score of the first cell group of resources for when a resource is removed from the first cell group;
      determine, via the cell intermingling layer, a complexity score between the first cell group of resources and the second cell group of resources for handing off, to the second cell group, a work product from the first project task accomplished by the first cell group of resources;

compare, via the cell intermingling layer, the fragility score to the complexity score;

when the complexity score is greater than the fragility score, update the communication interface to display, via the visualization layer, a recommendation to transfer the resource from the first cell group into the second cell group;

monitor, via a project monitoring layer, a performance of the first cell group of resources accomplishing the first project task;

generate, via the project monitoring layer, first performance statistics of the first cell group of resources;

upload, to the project performance database, the first performance statistics;

monitor, via the project monitoring layer, a performance of the second cell group of resources accomplishing the second project task;

generate, via the project monitoring layer, second performance statistics of the second cell group of resources;

upload, to the project performance database, the second performance statistics;

generate an adjacent performance rating, via a machine learning engine, wherein the adjacent performance rating reflects an effectiveness of handing off work product between the first cell group of resources and the second cell group of resources;

upload, to the project performance database, the adjacent performance rating;

generate an updated project template, via the machine learning engine, based on the first performance statistics, the second performance statistics, and the adjacent performance rating, wherein the updated project template includes an updated set of distinct project tasks for accomplishing the enterprise project;

store the updated project template in the project performance database as a revised project template;

identify a new cell group, via the machine learning engine, based on at least the first performance statistics and the second performance statistics, wherein the new cell group is identified as performing a distinct project task above a threshold performance level.

2. The enterprise server computer of claim 1, wherein the project management circuitry is configured to control the communication interface to retrieve, from the project performance database, the project performance data for the plurality of resources based on the plurality of resourcing including at least one resource attribute matching the project parameters.

3. The enterprise server computer of claim 1, wherein the first cell group is assigned the first project task adjacent in workflow to the second project task assigned to the second cell group according to the project template.

4. The enterprise server computer of claim 3, wherein the project management circuitry is configured to determine the first cell group of resources and the second cell group of resources based on the project performance data identifying a previous work experience between the first cell group of resources and the second cell group of resources.

5. The enterprise server computer of claim 1, wherein the project management circuitry is further configured to:

generate a first performance score based on the monitored performance of the first cell group of resources accomplishing the first project task; and upload, to the project performance database, the first performance score for the first cell group of resources.

6. The enterprise server computer of claim 5, wherein the project management circuitry is further configured to:

input the first performance score to a machine learning strategy to optimize the predetermined set of distinct project tasks included in the project template.

7. A method for managing a crowd sourced project, the method comprising:

controlling a communication interface to receive, from a computing resource, project parameters corresponding to an enterprise project;

controlling the communication interface to retrieve, via a team sourcing layer, from a project plan database, a project template corresponding to the enterprise project, wherein the project template includes a predetermined set of distinct project tasks that comprise a workflow for accomplishing the enterprise project;

controlling the communication interface to retrieve, via the team sourcing layer, from a project performance database, project performance data for a plurality of resources, the project performance data including a respective resource identifier and resource attributes for the plurality of resources;

determining, via the team sourcing layer, from the plurality of resources, a first cell group of resources for assigning a first project task included in the project template;

updating the communication interface to display, via a visualization layer, the first cell group of resources as a recommended resource for the first project task;

determining, via the team sourcing layer, from the plurality of resources, a second cell group of resources for assigning a second project task included in the project template;

updating the communication interface to display, via the visualization layer, the second cell group of resources as a recommended resource for the second project task;

determining, via a cell intermingling layer, a fragility score of the first cell group of resources for when a resource is removed from the first cell group;

determining, via the cell intermingling layer, a complexity score between the first cell group of resources and the second cell group of resources for handing off, to the second cell group, a work product from the first project task accomplished by the first cell group of resources;

comparing, via the cell intermingling layer, the fragility score to the complexity score;

when the complexity score is greater than the fragility score, updating the communication interface to display, via the visualization layer, a recommendation to transfer the resource from the first cell group into the second cell group;

monitoring, via a project monitoring layer, a performance of the first cell group of resources accomplishing the first project task;

generating, via the project monitoring layer, first performance statistics of the first cell group of resources;

uploading, to the project performance database, the first performance statistics;

monitoring, via the project monitoring layer, a performance of the second cell group of resources accomplishing the second project task;

generating, via the project monitoring layer, second performance statistics of the second cell group of resources;

uploading, to the project performance database, the second performance statistics;

generating an adjacent performance rating, via a machine learning engine, wherein the adjacent performance rating reflects an effectiveness of handing off work product between the first cell group of resources and the second cell group of resources;

uploading, to the project performance database, the adjacent performance rating;

generating an updated project template, via the machine learning engine, based on the first performance statistics, the second performance statistics, and the adjacent performance rating, wherein the updated project template includes an updated set of distinct project tasks for accomplishing the enterprise project;

storing the updated project template in the project performance database as a revised project template;

identifying a new cell group, via the machine learning engine, based on at least the first performance statistics and the second performance statistics, wherein the new cell group is identified as performing a distinct project task above a threshold performance level.

8. The method of claim 7, wherein controlling the communication interface to retrieve, from the project performance database, the project performance data for the plurality of resources is based on the plurality of resources including at least one resource attribute matching the project parameters.

9. The method of claim 7, wherein determining the first cell group comprises assigning the first project task adjacent in workflow to the second project task assigned to the second cell group according to the project template.

10. The method of claim 9, wherein determining the first cell group of resources and the second cell group of resources is based on the project performance data identifying a previous work experience between the first cell group of resources and the second cell group of resources.

11. The method of claim 7, further comprising:
generating a first performance score based on the monitored performance of the first cell group of resources accomplishing the first project task; and
uploading, to the project performance database, the first performance score for the first cell group of resources.

12. The method of claim 11, further comprising:
inputting the first performance score to a machine learning strategy to optimize the predetermined set of distinct project tasks included in the project template.

13. An enterprise server computer comprising:
a communication interface configured to:
communicate with a computing resource, a project plan database, and a project performance database; and
receive, from the computing resource, project parameters corresponding to an enterprise project;
project management circuitry coupled to the communication interface, the project management circuitry configured to:
receive, through the communication interface, the project parameters;
determine the project plan database does not store a project template corresponding to the enterprise project;
generate a workflow including a plurality of project tasks for the enterprise project based on the project parameters;

control the communication interface to retrieve, via the team sourcing layer, from the project performance database, project performance data for a plurality of resources, the project performance data including a respective resource identifier and resource attributes for the plurality of resources;

determine, via the team sourcing layer, from the plurality of resources, a first cell group of resources for assigning a first project task included in the workflow;

update the communication interface to display, via a visualization layer, the first cell group of resources as a recommended resource for the first project task;

determine, via the team sourcing layer, from the plurality of resources, a second cell group of resources for assigning a second project task included in the workflow;

update the communication interface to display, via the visualization layer, the second cell group of resources as a recommended resource for the second project task;

determine, via a cell intermingling layer, a fragility score of the first cell group of resources for when a resource is removed from the first cell group;

determine, via the cell intermingling layer, a complexity score between the first cell group of resources and the second cell group of resources for handing off, to the second cell group, a work product from the first project task accomplished by the first cell group of resources;

compare, via the cell intermingling layer, the fragility score to the complexity score;

when the complexity score is greater than the fragility score, update the communication interface to display, via the visualization layer, a recommendation to transfer the resource from the first cell group into the second cell group;

monitor, via a project monitoring layer, a performance of the first cell group of resources accomplishing the first project task;

generate, via the project monitoring layer, first performance statistics of the first cell group of resources;

upload, to the project performance database, the first performance statistics;

monitor, via the project monitoring layer, a performance of the second cell group of resources accomplishing the second project task;

generate, via the project monitoring layer, second performance statistics of the second cell group of resources;

upload, to the project performance database, the second performance statistics;

generate an adjacent performance rating, via a machine learning engine, wherein the adjacent performance rating reflects an effectiveness of handing off work product between the first cell group of resources and the second cell group of resources;

upload, to the project performance database, the adjacent performance rating;

generate an updated project template, via the machine learning engine, based on the first performance statistics, the second performance statistics, and the adjacent performance rating, wherein the updated project template includes an updated set of distinct project tasks for accomplishing the enterprise project;

store the updated project template in the project performance database as a revised project template;
identify a new cell group, via the machine learning engine, based on at least the first performance statistics and the second performance statistics, wherein the new cell group is identified as performing a distinct project task above a threshold performance level.

14. The enterprise server of claim 13, wherein the first cell group is assigned the first project task adjacent in workflow to the second project task assigned to the second cell group according to the project template.

15. The enterprise server computer of claim 13, wherein the project management circuitry is further configured to:
generate a first performance score based on the monitored performance of the first cell group of resources accomplishing the first project task; and
upload, to the project performance database, the first performance score for the first cell group of resources.

* * * * *